United States Patent
Andersen

(10) Patent No.: US 6,190,055 B1
(45) Date of Patent: Feb. 20, 2001

(54) REDUCING STRESS IN OPTICAL FIBERS

(75) Inventor: Bo Asp Moller Andersen, Bridgewater, NJ (US)

(73) Assignee: Lucent Technologies Inc., Murray Hill, NJ (US)

(*) Notice: Under 35 U.S.C. 154(b), the term of this patent shall be extended for 0 days.

(21) Appl. No.: 09/199,546

(22) Filed: Nov. 25, 1998

(51) Int. Cl.⁷ .................................................. G02B 6/36
(52) U.S. Cl. .......................................... 385/80; 385/84
(58) Field of Search ................................. 385/80, 84, 67, 385/59, 78

(56) References Cited

U.S. PATENT DOCUMENTS 4,989,946 * 2/1991 Williams et al. .................... 350/96.2
5,293,435 * 3/1994 Takahashi ............................. 385/85

* cited by examiner

*Primary Examiner*—Hung N. Ngo
(74) *Attorney, Agent, or Firm*—Lester H. Birnbaum

(57) ABSTRACT

The invention is an optical assembly which includes at least two optical fibers, each having a coated portion and a bare portion at one end. A spacer is placed between coated portions of the fibers so as to produce a gradual bending of the bare portions and thereby reducing stress on the bare portions.

9 Claims, 2 Drawing Sheets

REDUCING STRESS IN OPTICAL FIBERS

FIELD OF THE INVENTION

This invention relates to optical fibers.

BACKGROUND OF THE INVENTION

Optical fibers are now used extensively in optical transmission systems. Such fibers usually include a core through which light is propagated surrounded by a cladding having a lower index of refraction than the core. The cladding, in turn, is usually surrounded by an acrylate coating for protection of the fiber. In many components, such as Wavelength Division Multiplexed (WDM) filters, optical attenuators, and optical taps, the fibers are contained in terminations which may include 2 or more fibers inside a ferrule. The protective coating is typically stripped off the fibers at one end of the termination.

The positioning of the fibers in the ferrule can cause undue stress and result in breakage of one or more fibers. This is due at least in part to the fact that the stripped portions of the fibers are brought closer together than the coated portions resulting in an S-shaped bend where stress can be concentrated. For example, a typical core-to-core spacing for the coated portions is approximately 250 microns, while the spacing for the stripped portions is approximately 125 microns.

SUMMARY OF THE INVENTION

The invention is an optical assembly including at least two optical fibers, each fiber including a coated portion and a bare portion at one end thereof. The fibers are positioned so that the bare portions and coated portions of each fiber are in contact with the corresponding portions of the adjacent fiber over at least a portion of their lengths. A spacer member is included between the coated portions of the fibers to provide a bending of a segment of the coated portions.

BRIEF DESCRIPTION OF THE FIGURES

These and other features of the invention are delineated in detail in the following description. In the drawing.

It will be appreciated that, for purposes of illustration, these figures are not necessarily drawn to scale.

DETAILED DESCRIPTION

Figure 1:
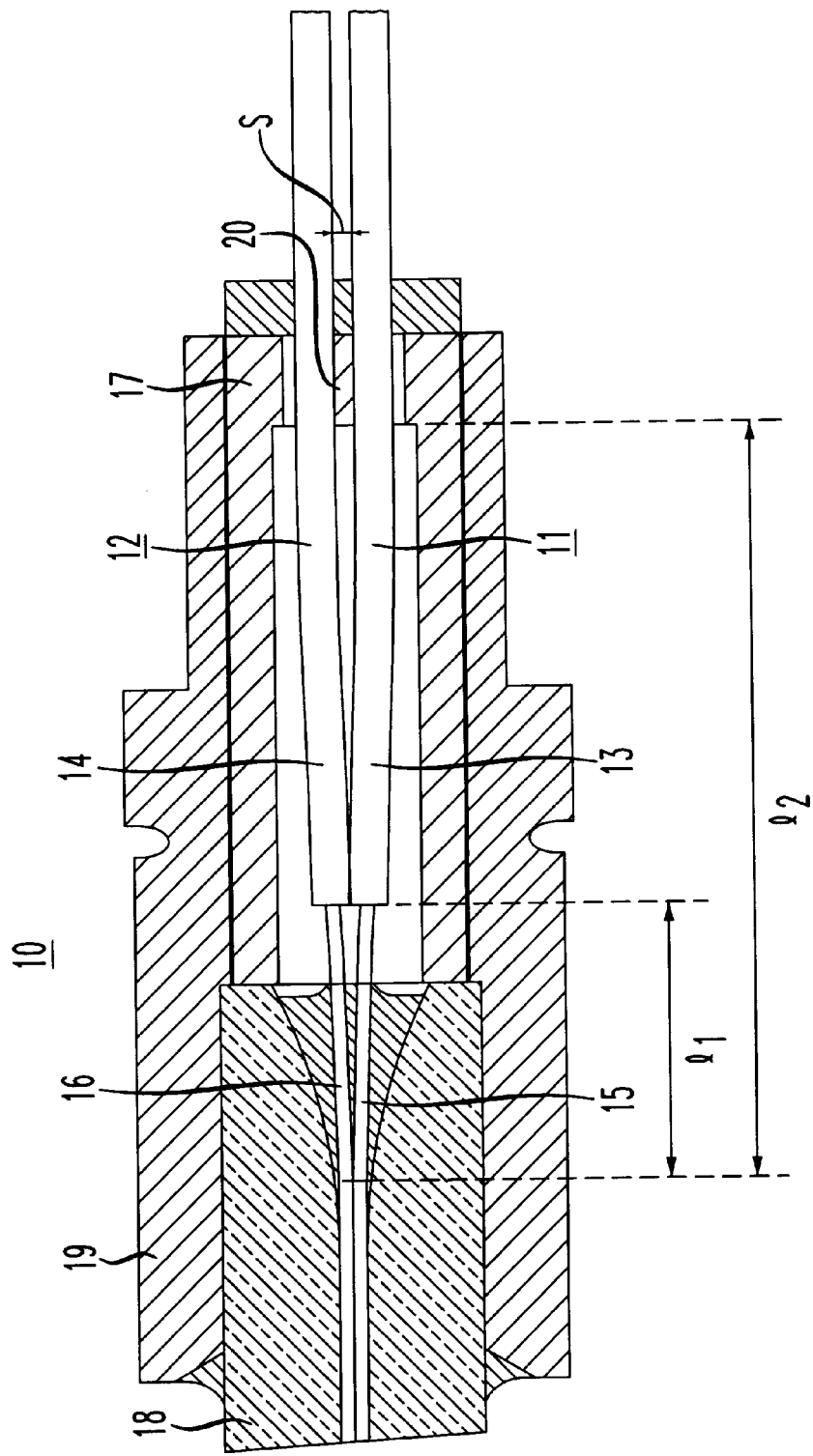
FIG. 1 is a cross sectional view of an optical assembly in accordance with an embodiment of the invention.

FIG. 1 illustrates an optical assembly, 10, which incorporates features of the invention. The assembly includes at least two optical fibers, 11 and 12. Each fiber, 11 and 12, includes a portion which is covered by a protective coating which is typically an acrylate to form coated portions, 13 and 14, respectively. The coating is stripped off at one end of each fiber, 11 and 12, to form bare portions, 15 and 16, respectively. The fibers, 11 and 12, are mounted within a sheath, 17, which is typically metal. The bare portions, 15 and 16, extend into a capillary tube, 18, which is typically made of glass or ceramic. The sheath, 17, and capillary tube, 18, with the fibers, 11 and 12, therein, are mounted within a standard ferrule, 19, which is typically made of metal. The bare portions, 15 and 16, are positioned for coupling light through a lens (not shown) to some other optical component, such as a wavelength division multiplexer (not shown).

In accordance with a feature of the invention, the coated portions, 13 and 14, are contiguous over only a portion of their lengths within the ferrule, 19. Segments of the coated portions, 13 and 14, are separated a distance, s, by a spacer, 20, which is part of the sheath 17. However, it will be appreciated that any spacer can be used as long as it sufficiently separates the coated portions in keeping with the objectives of the invention. The separation, s, in this embodiment is approximately 200 microns.

Figure 2:
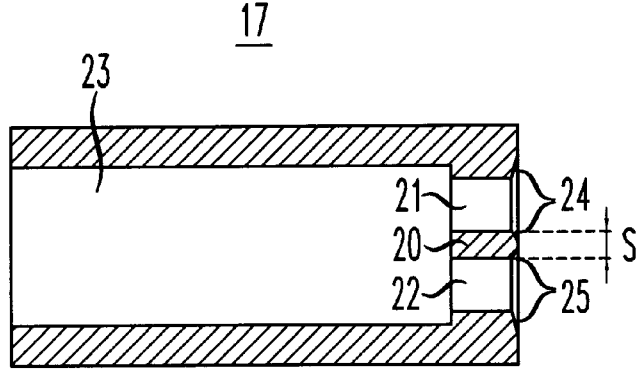
FIG. 2 is a cross sectional view of a portion of the assembly in accordance with the same embodiment.
Figure 3:
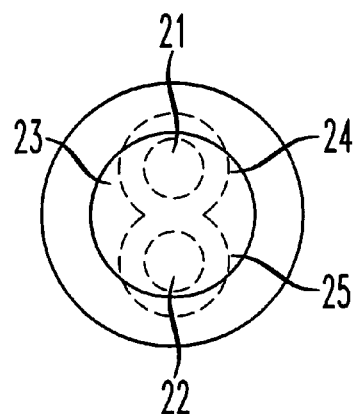
FIGS. 3 and 4 are end views of the assembly in accordance with the same embodiment.
Figure 4:
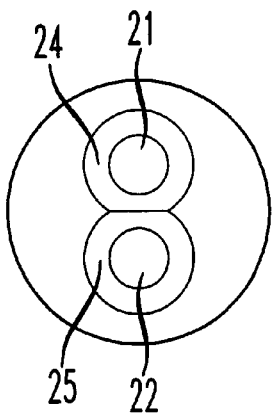

FIG. 2 illustrates the sheath, 17, including the spacer, 20, which is typically made of metal. The sheath, 17, including the spacer, 20, is typically a cylindrical shape with a hole, 23, having a large diameter of typically 1 millimeter drilled from one end, and two holes, 21 and 22, with smaller diameters of typically 350 microns drilled from the other end. The spacer, 20, is the wall between the holes with the small diameters, 21 and 22. The entrance of the holes with the small diameters, 21 and 22, have chamfers, 24 and 25.

In typical prior art terminations, the coated portions were contiguous over their entire length. For a core-to-core spacing of 250 microns, this meant that the bare portions had to bend from a 250 micron separation to a 125 micron separation over a length, $l_1$, from the ends of the coated portions to the point where the bare portions are brought together, which was typically 3 mm. This severe bending created undesired stress. By separating the coated portions of the fibers by a distance, s, a certain distance, $l_2$, from the segment where the bare portions of the fibers are in contact to the point of maximum separation, the fibers can be bent over a much longer distance with only a small increase in the length of the bare portions. For reduced stress, it is recommended that the separation, of the two fibers be approximately 200 microns and that the bending length, $l_2$, be approximately 10 millimeters. The length, $l_1$, of the bare portion is typically 4 millimeters. In general, it is recommended that $l_2$ lie within the range 5 to 15 mm, and the spacer provide a spacing, s, within the range 100–300 microns.

What is claimed is:

1. An optical assembly comprising:
   at least two optical fibers, each fiber including a coated portion and a bare portion at one end thereof, the fibers being positioned so that bare portions and coated portions of each fiber are in contact with the corresponding portions of the other fiber over at least a portion of their lengths; and
   a spacer member placed between the coated portions of the fibers to provide a bending of a segment of the coated portions.

2. The assembly according to claim 1 further comprising a ferrule within which the fibers are positioned.

3. The assembly according to claim 2 further comprising a sheath within which the coated portions are positioned, and a capillary tube within which the bare portions are positioned.

4. The assembly according to claim 3 wherein the spacer is an intergral part of the sheath.

5. The assembly according to claim 3 wherein the spacer comprises a wall between two holes formed in the sheath.

6. The assembly according to claim 1 wherein the segments of the coated portions and bare portions are bent over a length within the range 5 to 15 millimeters.

7. The assembly according to claim 1 wherein the spacer provides a maximum separation between coated portions within the range 100 to 300 microns.

8. The assembly according to claim 1 wherein the coated portions are coated with an acrylate.

9. The assembly according to claim 1 wherein the bending of the coated portions produces a gradual bending of the bare portions.

* * * * *